Figure 1:
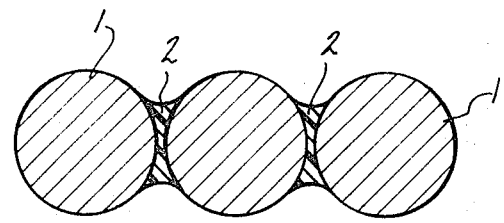

United States Patent
Valyi

[15] 3,666,006
[45] May 30, 1972

[54] HEAT EXCHANGER

[72] Inventor: Emery I. Valyi, Riverdale, N.Y.

[73] Assignee: Olin Corporation

[22] Filed: May 4, 1970

[21] Appl. No.: 34,409

Related U.S. Application Data

[63] Continuation-in-part of Ser. No. 754,995, Aug. 23, 1968, Pat. No. 3,539,672.

[52] U.S. Cl. ............................ 165/164, 165/133, 165/180, 165/181
[51] Int. Cl. ............................................. F28f 1/16
[58] Field of Search ................... 165/164, 133, 180, 181; 29/157.3

[56] References Cited

UNITED STATES PATENTS

| 2,401,797 | 6/1946 | Rasmussen | 165/180 X |
| 3,498,371 | 3/1970 | Zygiel | 165/180 X |

FOREIGN PATENTS OR APPLICATIONS

| 1,377,391 | 9/1964 | France | 165/133 |
| 482,711 | 4/1938 | Great Britain | 165/180 |
| 531,112 | 12/1940 | Great Britain | 165/180 |

Primary Examiner—Albert W. Davis, Jr.
Attorney—Robert H. Bachman and Gordon G. Menzies

[57] ABSTRACT

An improved heat exchanger utilizing bonding metal particles, especially aluminous, cuprous or ferrous particles. The particles are bonded together and to an imperforate metal member utilizing a thin coating of resin as the bonding medium.

6 Claims, 2 Drawing Figures

Patented May 30, 1972

3,666,006

INVENTOR,
EMERY I. VALYI

BY
ATTORNEY

HEAT EXCHANGER

This application is a division of copending application Ser. No. 754,995 by, now U.S. Pat. No. 3,539,672, granted Nov. 10, 1970 E.I. Valyi for "Method of Bonding Metal Particles."

In accordance with art practice, it is customary to bond individual metal particles to each other for a variety of purposes, particularly for use in heat exchangers. It is customary to bond the individual metal particles to each other to form a porous body. The particles are also bonded to the shell or container of a heat exchanger.

Metal particles are generally bonded to each other and to the shell or container by metallic bonding techniques, such as soldering, brazing or diffusion bonding. For example, the particles may be brazed together utilizing a thin film or coating of brazing alloy. The brazing alloy is generally in powder or flake form admixed in a carrier. The slurry of carrier and brazing alloy is coated on the surface to be brazed and the coated surface heated to brazing temperature for the requisite period of time.

It is generally considered essential to form a metallic bond of this kind, because, in heat exchange applications at least, transfer across the interface between particles is thought to substantially influence the heat transfer performance of the heat exchanger.

However, this has caused numerous problems. Limitations exist as to the alloy systems that may be practically employed in manufacturing composites of this type. Thus, it is very difficult to produce heat exchangers utilizing bonded metal particles of brass because the temperatures which must be employed for adequate brazing of brass tend to induce evaporation of the zinc contained in the brass. In the case of aluminum alloys, the joining techniques are extremely difficult. Brazing and soldering of aluminum cannot be carried out without the use of fluxes which are corrosive and which must be removed without a trace before the product can be used for many applications. Such removal is either too expensive or not entirely reliable. In addition, art processes for forming bonded metal particles are frequently expensive and inconvenient to use.

Accordingly, it is a principal object of the present invention to provide a simple and convenient method for bonding metal particles, the bonded particles produced thereby, and heat exchange systems utilizing the bonded metal particles.

It is a still further object of the present invention to provide a method as aforesaid which attains bonded particles having good heat transfer characteristics and which are readily adaptable for use in heat exchange systems.

Further objects and advantages of the present invention will be readily apparent hereinafter.

Figure 2:
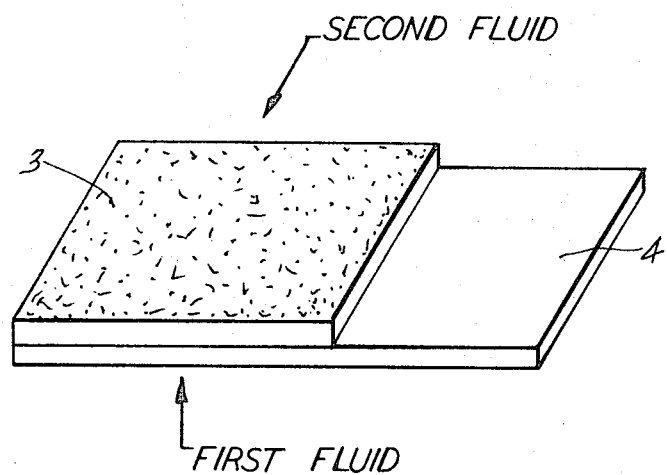

The present invention will be more readily understood from a consideration of the drawings in which: FIG. 1 schematically represents the bonded particles of the present invention; and FIG. 2 schematically represents a heat exchange system utilizing the bonded particles.

In accordance with the present invention, the metal particles are joined by the following method: providing metal particles to be joined, preferably aluminum or aluminum base alloys, copper or copper base alloys, iron or iron base alloys; coating said particles with a resin selected from the group consisting of thermosetting and thermoplastic resins, preferably thermosetting, said coating being provided to a thickness of 0.0001 to 0.005 inch; forming an assembly by placing said coated particles into intimate contacting relationship; heating said assembly to a temperature above the melting point of said resin but below the melting point of said metal; and cooling said assembly, thereby forming a firmly bonded assembly.

If the resin is thermosetting, the heating is for a period of time sufficient to harden the particular resin. If the resin is thermoplastic, the heating is for a period of time sufficient to melt the resin and the subsequent cooling step causes the resin to harden.

It has been found that the foregoing process enables the attainment of a firmly bonded assembly. As stated hereinabove, there is utilized a thin coating of thermosetting or thermoplastic resin as the bonding medium. When the coated particles are placed in an assembly and heated above the melting point of the resin, the coating flows around the periphery of the particles to the point nearest the adjacent particle. Thus, the particles are separated by an hourglass shaped or venturi shaped mass of resin. Continued exposure at elevated temperature for a period of time of at least 30 seconds causes the thermosetting resin to harden or set up in accordance with well known principles. The thermoplastic resin is melted by exposure to elevated temperature for a period of time of at least 30 seconds. The cooling step causes the thermoplastic resin to harden or set up in accordance with well known principles. In either event, when the mass is cooled to room temperature, there is formed a well bonded porous mass, with the individual particles bonded together by thermosetting or thermoplastic resin having the configuration described above as shown schematically in FIG. 1 in which particles 1 are bonded together by resin 2.

The heat exchange system utilizing the foregoing bonded particles may be described as follows: A heat exchanger comprising a sheet-like mass of metal particles bonded together by a thermosetting or thermoplastic resin to form a porous body, an imperforate sheet metal member bonded to said metal particles by said resin, said member separating first and second heat exchange fluids, wherein the thickness and location of the particle body is such that in operation the second fluid passing therethrough is at all parts of its path in the porous body in effective heat exchange relationship with the sheet metal member and, thus, with the first fluid. This is shown schematically in FIG. 2 in which a sheet-like mass of bonded metal particles 3 is bonded to imperforate sheet metal member 4.

In accordance with the present invention, the foregoing process is simple, convenient and inexpensive. The bonded particles of the present invention are well bonded and readily obtained. In addition, it has been found that the bonded particles of the present invention have surprising utility in heat exchange applications. This is particularly surprising since the present invention employs a bond formed by materials which in themselves are heat insulators rather than materials which transfer heat. In accordance with the present invention it has been found that if the thickness of the resin is attained in the foregoing range, excellent heat transfer characteristics are obtained in the bonded product. This enables the attainment of numerous significant advantages. In the first place, this enables the use of alloy systems heretofore not readily useable in heat exchange applications which use bonded metal particles. In the second place, this provides a simple, convenient and inexpensive method for bonding metal particles for use particularly in heat exchange applications.

In accordance with the present invention, the metal particles to be bonded are provided in any desired shape or form. The particles are preferably spherical or very nearly so, or irregularly shaped, although any convenient shape may be provided. The size of the metal particles is not especially critical, although it is preferred that the particles have a size of about from 8 to 100 mesh. Any desired metal particle may, of course, be utilized, although it is preferred to use aluminum or aluminum base alloys, copper or copper base alloys, iron or iron base alloys, titanium or titanium base alloys and graphite.

Concerning the resins which may be employed, it is preferred to use thermosetting resins. It is particularly preferred to use condensation products of epichlorohydrin and bisphenol-A, epoxy resins in general and polyurethane resins. Typical thermoplastic resins which may be used are nylon and polyolefins. It should be noted that thermoplastic resins should be used only for those applications where the heating and cooling media are at relatively low temperatures as thermoplastic materials tend to soften at elevated temperatures.

In accordance with the present invention, the resin is coated on the metal particles to a thickness of from 0.0001 to 0.005 inch. The coating thickness is particularly important since if the coating is too thick, insufficient heat transfer characteristics will be obtained and if the coating is too thin, a poor bond will be obtained.

The preferred method of applying the coating is as follows: The resin is dissolved in a solvent which is volatile at ambient temperatures, such as acetone or methyl ethyl ketone. It is preferred to dissolve the resin in from 2 to 15 percent by weight of solvent. This forms a free flowing, stable liquid of resin dissolved in solvent. The metal particles and resin-solvent mixture are thoroughly admixed. The proportion of metal particle to resin may be varied within a wide range so that a resin coating of the desired thickness will be provided. Preferably there is used from about 2 grams of resin per pound of metal up to about 100 grams per pound of metal, and optimally from about 5 to 50 grams of resin per pound of metal.

In the preferred embodiment, the metal particles and the resin-solvent mixture are thoroughly admixed by tumbling to dryness. This normally takes from 5 minutes to 2 hours depending upon the particular materials employed. The tumbling procedure volatilizes the solvent and leaves the resin coated on the metal particles.

The coated metal particles are placed in an assembly or fixture. The coated metal particles are placed into intimate contacting relationship in an assembly having a desired configuration.

The assembly is then heated to a temperature above the melting point of the resin but below the melting point of the metal particles. This effectively melts the resin and causes the resin to flow on the surface of the particles and agglomerate into the immediate proximity of the contact points between the particles because of capillary action. In other words, if one is to consider two adjoining and contacting spheres, both coated as described, the zone immediately surrounding the contact point represents a small enough cross section for capillary forces to function therein; and, thus, upon melting of the coating, the coating will tend to agglomerate or be drawn into the zone within which such capillary force can act.

In the preferred embodiment which uses thermosetting resins, the heating process causes the resin to set up or harden, with the metal particles being bonded together by an agglomerated material in the area of contact between the particles. Depending of course upon the particular materials used, the materials should be held at elevated temperatures of from 100° to 500° F for a period of time of at least 30 seconds and preferably for from at least 1 to 30 minutes.

When thermoplastic resins are used, depending of course upon the particular materials used, the materials should be held at elevated temperatures of from 100° to 500° F for at least 30 seconds and preferably from 30 seconds to 5 minutes.

Upon cooling to room temperature there is provided a well bonded mass, bonded together as described hereinabove.

The bonded mass has a desired degree of porosity. Thus, in the areas where the particles are not bonded together, fluid may readily flow between the particles. The degree of porosity may be controlled by the process variables.

As stated hereinabove, the bonded porous mass of the present invention attains surprising heat exchange efficiency despite the fact that an insulating material is used as the bonding medium.

If desired, extra bonding material may be applied to the outer, exposed surfaces in order to fortify the bond at that point without adding additional bonding material to the heat conducting matrix.

The present invention and improvements resulting therefrom will be more readily apparent from a consideration of the following illustrative examples.

EXAMPLE I

Commercial purity aluminum shot having a particle size from −20 to +30 mesh was admixed in a tumbler with a solvent solution of an epoxy resin which was a condensation product of epichlorohydrin and bisphenol-A. There was used an epoxy resin solution, with the epoxy resin dissolved in 8 percent by weight of acetone. The epoxy-resin-solvent mixture was tumbled to approximately free flowing characteristics, free of solvent. This resulted in aluminum shot coated with the epoxy resin.

Varying amounts of epoxy resin were used per pound of shot as indicated in the following table.

TABLE I

| Sample | Amount of Epoxy Resin Per Pound Of Shot |
|---|---|
| A | 2.7 grams |
| B | 4.05 grams |
| C | 5.4 grams |
| D | 10.4 grams |

EXAMPLE II

Test coupons were made in the following manner. Ten grams of each of the foregoing samples of coated shot were cured by heating to a temperature of 350° F for 30 minutes and subsequently cooling to room temperature. The resultant mass was well bonded and porous, with the individual metal particles being separated by an hour glass or venturi shaped mass of resin. The individual particles are bonded together by the resin having the foregoing configuration.

EXAMPLE III

Samples A, B, C, and D, bonded as described in Example II, were subjected to the following test in order to measure the porosity or permeability of the bonded mass. Each sample was placed in a tube 6 inches long by 1-3/32 inches in diameter. The tubes were given a ½ inch high bottom diaphragm of the samples bonded as in Example II.

The permeability was measured in the following manner. There was measured the time it took for 100 cc of water to pass through the diaphragm with the following results.

TABLE II

| Sample | Time |
|---|---|
| A | 12 seconds |
| B | 12 seconds |
| C | 12 seconds |
| D | 14 seconds |

There was also measured the time it took for a full tube of water to flow through the diaphragm when the tube was submerged in a beaker full of water and quickly removed. The time was measured from removal to end of flow. The total volume of water in the tube was 84 cc. The results are as follows.

TABLE III

| Sample | Time |
|---|---|
| A | 9 seconds |
| B | 8 seconds |
| C | 8 seconds |
| D | 12 seconds |

EXAMPLE IV

The samples were subjected to compression tests. The compression test cylinders were prepared from aluminum shot samples which were 1 inch in diameter by 1 inch high and which were bonded together as described in Example II. The compression was tested in a hydraulic press which measured both the deflection and pressure. The results are described in the following table.

TABLE IV

Deflection in thousandths of an inch

| Pressure | Sample A | Sample B | Sample C | Sample D |

| Pounds | | | | |
| --- | --- | --- | --- | --- |
| 100 | Broke | 10 | 14.5 | 15 |
| 200 | | 33 | 19.0 | 21.5 |
| 300 | | Broke at 290 | 23.0 | 27.0 |
| 400 | | | 24.0 | 29.5 |
| 500 | | | 27.0 | 33.0 |
| 600 | | | 28.5 | 36.0 |
| 700 | | | Broke at 760 | 40.0 |
| 800 | | | | 43.0 |
| 900 | | | | 47.0 |
| | | | | Broke at 935 |

EXAMPLE V

Heat transfer coupons were prepared from Samples A, B, C, and D in the following manner. The coupons consisted of a top and bottom cover of commercial purity aluminum 1-¼ inch in diameter by 1-¼ inch high with a center cylinder of the coated shot bonded together as described in Example II. The center shot cylinder was 1 inch in diameter by 1 inch high. The top cover plate had a 3/32 inch diameter hole in its center for a thermocouple. A 1 inch wide asbestos ribbon was wound around the center of the coupon approximately four times. This gave an insulating thickness of about one-fourth of an inch.

Samples A, B, C, and D had the composition as described in Example I. Sample E represented a solid slug of aluminum of the same geometry and insulated in the same way. Table V represents the heat transfer coupon being placed upon a hot plate which was maintained at a constant temperature of 360° F. There is shown the time in minutes for the top of the particular sample to achieve a given temperature, thus showing the heat transfer ability of the particular sample.

TABLE V

| Time, minutes | Temperature of hot plate, ° F. | Temperature of top of sample, ° F. | | | | |
| --- | --- | --- | --- | --- | --- | --- |
| | | Sample A | Sample B | Sample C | Sample D | Sample E |
| 0 | 360 | 100 | 100 | 100 | 100 | 250 |
| 4 | 360 | 150 | 140 | 150 | 150 | 310 |
| 6 | 360 | 150 | 150 | 150 | 160 | 340 |
| 10 | 360 | 175 | 165 | 150 | 190 | 350 |
| 13 | 360 | 180 | 190 | | 200 | 350 |
| 16 | 360 | 200 | 200 | 200 | 200 | 360 |
| 20 | 360 | 200 | 200 | 200 | 200 | 360 |
| 25 | 360 | 210 | 210 | 210 | 220 | 360 |
| 30 | 360 | 225 | 225 | | 235 | 360 |
| 35 | 360 | 240 | 225 | 225 | 240 | 360 |

Table VI shows the same data, with the temperature of the hot plate being raised slowly.

TABLE VI

| Time, minutes | Temperature of hot plate, ° F. | Temperature of top of sample, ° F. | | | | |
| --- | --- | --- | --- | --- | --- | --- |
| | | Sample A | Sample B | Sample C | Sample D | Sample E |
| 0 | 80 | 80 | 80 | 80 | 80 | 80 |
| 2 | 100 | 100 | 100 | 100 | 100 | 100 |
| 3 | 125 | 100 | 100 | 100 | 100 | 100 |
| 5 | 175 | 100 | 100 | 100 | 100 | 125 |
| 10 | 320 | 125 | 110 | 125 | 140 | 300 |
| 13 | 350 | 150 | 150 | 150 | 160 | 330 |
| 16 | 360 | 175 | 175 | 175 | 190 | 350 |
| 19 | 360 | 190 | 190 | 190 | 200 | 360 |
| 30 | 360 | 220 | 220 | 225 | 225 | 360 |

Table VII shows the data with the temperature of the hot plate being raised slowly and compares Sample C with a 10 percent aluminum solder bond using the same aluminum shot (Sample F) and with Sample E.

TABLE VII

| Time, minutes | Temperature of hot plate, ° F. | Temperature of top of sample, ° F. | | |
| --- | --- | --- | --- | --- |
| | | Sample C | Sample F | Sample E |
| 0 | 99 | 80 | 80 | 80 |
| 5 | 195 | 90 | 100 | 110 |
| 8 | 260 | 100 | 110 | 175 |
| 11 | 285 | 100 | 140 | 210 |
| 14 | 290 | 110 | 150 | 240 |
| 17 | 295 | 110 | 150 | 250 |
| 25 | 295 | 110 | 170 | 250 |
| 30 | 300 | 160 | 175 | 260 |
| 35 | 305 | 160 | 180 | 260 |
| 40 | 305 | 160 | 190 | 270 |

The foregoing tests show that the heat transfer value of the resin bonded shot is comparable with soldered shot.

EXAMPLE VI

Heat transfer tests were conducted on the following heat exchangers. A 2 inch diameter copper shell was filled with nine flat oval tubes having a height of one-half inch, having a width of 0.088 inch and a wall thickness of 0.014 inch. The tubes and shell were of commercial purity copper. The shell and tubes were 4 inches long between header plates.

In heat exchanger G, the core was filled with commercial purity copper shot having a particle size of −20 to +30 mesh, bonded together and to the shell wall and to the tube walls as described in Example II. Heat exchanger H utilized tubing with smooth walls and with no secondary fin surface. Heat exchanger I was made with round tubes having the same inside surface as the flat tubes and having integral spun fins on the external surface thereof and no shot. In heat exchanger J the tubes were the same as in heat exchangers G and H and the core was filled with commercial purity copper shot having a particle size of −30 to +30 mesh bonded together and bonded to the shell wall and bonded to the tubes with a phosphorus - copper brazing alloy.

The heat exchangers were tested in the following manner. Water flowed through the tubes and oil cross flowed through the spaces between the tubes, both in a single pass. The oil was at a higher temperature than the water. The heat transfer coefficient was then determined based on the interior surface of the tubes. The values are shown in the following table.

TABLE VIII

| Heat Exchanger | Heat Transfer Coefficient In BTU Per Hour Per °F Per Square Foot Inside Surface Of Tubes |
| --- | --- |
| G | about 500 |
| H | about 100 |
| I | about 220 |
| J | about 1100 |

The foregoing data shows clearly that the resin bonded heat exchanger performs surprisingly well despite the fact that the resin bonding the shot is an insulating material rather than a conducting material.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A heat exchanger assembly for exchanging heat between two fluids comprising a firmly bonded, fluid pervious mass of metal particles for conveying a second heat exchange fluid, said particles having a particle size of from 8 to 100 mesh and being bonded together by a resin selected from the group consisting of a thermosetting resin and a thermoplastic resin, there being from about 2 grams to about 100 grams of resin per pound of metal particles said metal particles being separated by an hourglass shaped mass of said resin, an imperforate metal member bonded to said particles by said resin for conveying a first heat exchange fluid, said member providing an imperforate separation between said first and second fluids, wherein the thickness and location of the bonded particles is such that in operation the second fluid passing therethrough is at all parts of its path in the porous body in effective heat exchange relationship with the metal member and thus with the first fluid.

2. A heat exchange assembly according to claim 1 wherein said particles are selected from the group consisting of aluminum, aluminum base alloys, copper, copper base alloys, iron and iron base alloys.

3. A heat exchange assembly according to claim 1 wherein said resin is a thermosetting resin.

4. A heat exchange assembly according to claim 1 wherein additional resin bonds exposed surfaces of said porous mass.

5. A heat exchange assembly according to claim 1 wherein said particles have a particle size of from 8 to 100 mesh.

6. A heat exchange assembly according to claim 2 wherein said particles are selected from the group consisting of aluminum and aluminum base alloys.

* * * * *